Aug. 4, 1959 R. TOWNSEND ET AL 2,898,513

ELECTRONIC SWITCHING CIRCUITS EMPLOYING MULTI-CATHODE GAS-FILLED TUBES

Filed Dec. 7, 1955 2 Sheets-Sheet 1

INVENTORS
RALPH TOWNSEND
JOHN JOSHUA SHARP
BY [signature]
ATTORNEY

INVENTORS
RALPH TOWNSEND
JOHN JOSHUA SHARP
BY [signature]
ATTORNEY 2,898,513

ELECTRONIC SWITCHING CIRCUITS EMPLOYING MULTI-CATHODE GAS-FILLED TUBES

Ralph Townsend and John Joshua Sharp, Stevenage, England, assignors to International Computers and Tabulators Limited, London, England Application December 7, 1955, Serial No. 551,655

Claims priority, application Great Britain April 7, 1955

8 Claims. (Cl. 315—84.6)

This invention relates to electronic switching apparatus employing multi-cathode gas-filled counting tubes.

In various types of electronic apparatus it is necessary to render a number of circuits effective in turn, in a predetermined sequence. One example aries in the programming of an electronic computing machine. A problem is broken down into a number of elementary operations, such as addition, subtraction and transfer from a particular storage location. The various circuits which performs these elementary operations must then be made effective in the particular sequence required by the problem.

The various operations may take different times, so that it is convenient to generate a so-called "operation complete" pulse at the end of each operation, and to use this pulse to initiate the next operation by stepping a sequence register, which is connected up to control the whole sequence of operations for the problem.

It is usual to provide facilities for selecting either of two parts of a programme, or repeating part of a programme, during the course of the calculation. The criterion for selection or repetition may be, for example, the sign of a chosen number produced at a particular point in the calculation.

An object of the invention is to provide an improved electronic switching device employing a multi-cathode gas-filled counting tube or tubes, in which a discharge is normally stepped round an array of cathodes in a predetermined sequence, the device including means for producing a stepping sequence different from the predetermined sequence.

Another object of the invention is to provide a switching device in which part of a switching sequence may be repeated, or not, as desired.

A further object of the invention is to provide an improved sequence register for controlling the programme of operations of a computer.

According to the invention electronic switching apparatus has a multi-cathode gas-filled counting tube, driving means operable by input pulses to step the anode/cathode discharge along the cathodes in a predetermined sequence, means operable under joint control of the input pulses and the voltage of a first of the cathodes to step the discharge from said first cathode to a second cathode, other than to which the discharge would be stepped in the predetermined sequence, and switching means controlled by the voltages of at least said first and second cathodes. Two or more counting tubes may be employed, means being provided for preventing the maintenance of a discharge in more than one of the tubes at a time.

The invention will now be described, by way of example, with reference to the accompanying drawings, in which:

Figure 1 shows in block form a sequence register which is set up by manual connections to permit the following sequence of programme steps—

Figure 1:
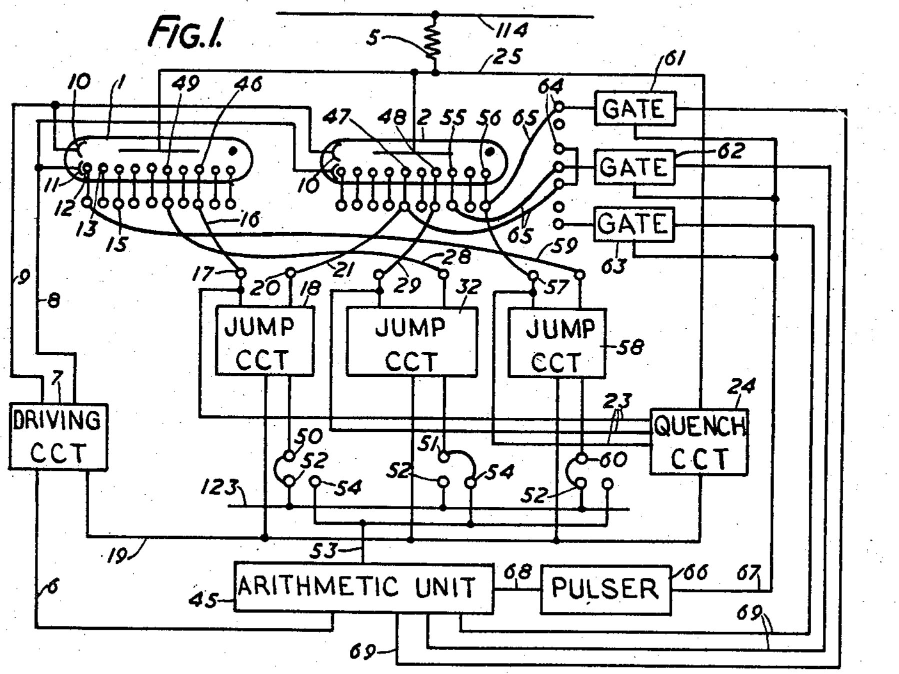
Figure 1 is a block diagram of a sequence register and arithmetic unit.

1—8, 15—17, 6—8 and 15—17 repeated, 18—20

Two multi-cathode gas-filled counting tubes 1 and 2 each have their anode connected to a positive supply line 114 through a common anode resistor 5. The value of the resistor 5 is such that a glow discharge can be maintained in only one of the tubes 1 and 2 at a time. That is, if a current equal to twice that drawn by one glow discharge flows through the resistor 5, the voltage of the commoned anodes falls below that necessary to maintain a glow discharge.

Positive "operation complete" pulses are emitted by an arithmetic unit 45 and appear on a line 6. Each pulse operates a driving circuit 7 to produce a negative output pulse on each of two lines 8 and 9. The two pulses are partially overlapping in time. For example, the pulses may be 10 micro-seconds long, with the leading edge of the pulse on the line 9 occurring 7 micro-seconds after the leading edge of the pulse on line 8.

The line 8 is connected to a first guide electrode 11 of each of the tubes 1 and 2. The line 9 is similarly connected to a second guide electrode 10. At the first step, the glow discharge is between the anode of the tube 1 and a "1" cathode 12. The method of setting this initial condition will be described later.

A negative pulse on the line 8 causes the discharge to transfer from the cathode 12 to the first guide electrode 11. The delayed pulse on the line 9 transfers the discharge to the second guide electrode 10. When this latter pulse ceases, the discharge transfers to an adjacent "2" cathode 13. A detailed description of the discharge stepping operation is given in an article entitled "The Dekatron," by R. C. Bacon and J. R. Pollard in "Electronic Engineering," dated May 1950.

Further input pulses will cause the discharge to step along until it is located on an "8" cathode 46. Each of the cathodes has a plug socket 15 connected to it. A connection 16 is made to the socket 15 of the cathode 46 to an input plug socket 17 of a jump circuit 18. When the discharge is located on a particular cathode, the voltage of that cathode rises, so that the jump circuit 18 will now receive a positive conditioning voltage via the connection 16.

The driving circuit 7 produces a positive pulse on a line 19 each time it is operated by an input pulse. The pulses on the line 19 are fed to the jump circuit 18, but are effective to operate it only when it is conditioned. When the circuit 18 receives a pulse from the line 19, resulting from the eighth input, pulse it is already conditioned, and it produces a negative pulse at an output socket 20. A connection 21 joins the socket 20 to a socket 15 which is connected to a "15" cathode 47 of the tube 2.

A quench circuit 24 also receives pulses on the line 19, and is conditioned by the voltage at the socket 17, via a line 23. The quench circuit is connected to the anodes of the tubes 1 and 2 by a line 25. The eighth pulse on the line 19 operates the quench circuit, reducing the voltage on the line 25.

The drop in voltage of the anode of the tube 1 extinguishes the discharge. The line 25 rises again after 30 micro-seconds. The negative pulse on the cathode 47 lasts for 70 micro-seconds, so that as the anodes rise, a discharge is initiated between the anode of the tube 2 and the cathode 47, there being a greater voltage difference for this cathode than for any of the others. The anode resistor 5 prevents a discharge being initiated in the tube 1.

If the voltage of the cathode 47 is reduced sufficiently, a discharge will be established to this cathode. Due to the common anode resistor 5, the anode of the tube 1 will fall below the point at which the discharge in the tube 1 can be maintained. Hence it is not essential to utilise a quench circuit. The use of the circuit provides a more positive operation and also reduces the transfer time, since quenching starts simultaneously with the fall of the cathode 47.

The discharge will be located on a "17" cathode 48 after a further two input pulses. The cathode 48 conditions a second jump circuit 32, via connection 29. The output pulse of the jump circuit 32 is fed by a connection 28 to a "6" cathode 49 of the tube 1.

The jump circuits 18 and 32 are controlled by sockets 50 and 51 respectively, which can be connected either to sockets 52 connected to a ground line 123, or to sockets 54 connected to a line 53. The voltage of the line 53 is controlled by the arithmetic unit 45 and is such that it is at earth potential when a series of programme steps have to be repeated, but is negative when no repetition is required.

The jump circuits 18 and 32 function if the sockets 50 and 51 are at earth potential but do not function if the voltage of these sockets is negative. The socket 50 is shown connected to the socket 52, so that no control over the operation of the jump circuit 18 occurs and the transfer of the discharge from the cathode 46 to the cathode 47 is unconditioned. The socket 51 is shown connected to the socket 54, so that the operation of the jump circuit 32 is controlled by the arithmetic unit 45, and the transfer of the discharge from the cathode 48 to the cathode 49 is conditioned. If the voltage of the line 53 is at earth potential, the jump circuit operates to transfer the discharge from the cathode 48 to the cathode 49 of the tube 1. The quench circuit 24 is conditioned by the cathode 48 of the tube 2 by another conditioning line 23, so that it operates to extinguish the discharge in the tube 2.

Two more input pulses transfer the discharge to the cathode 46, the next pulse operates the jump circuit 18 and the discharge is transferred to the cathode 47. After two more pulses the discharge once again rests on the cathode 48. If the voltage of the line 53 is still at earth potential, the jump circuit 32 operates again and the cycle of steps just described is repeated when the voltage of the line 53 is negative; the jump circuit 32 is prevented from functioning so that when the discharge is on the cathode 48 it is transferred by the next input pulse to a next cathode 55.

After two further input pulses, the discharge rests on a final cathode 56, which is connected via the socket 15 to an input socket 57 of a third jump circuit 58. The output socket of the jump circuit 58 is connected by a line 59 to the "1" cathode 12, and a control socket 60 is connected to the ground line 123: so that when the discharge is on the cathode 56 it is transferred unconditionally back to the first cathode at the next pulse. The quench circuit 24 is conditioned by the cathode 56 via a further conditioning line 23: so that it operates to extinguish the discharge in the tube 2.

Each operation of the arithmetic unit 45 is controlled by a gate, three only of which, 61, 62 and 63, are shown. A gate is controlled by a positive voltage on one input line and a positive pulse on the other input line. When these two inputs are present simultaneously, the gate gives a negative pulse on an output line. The first input line to each gate is connected to one or more sockets 64, seven of which are shown. These sockets can be connected to selected cathode sockets 15 by lines 65. As shown, the cathode 56 is connected to the input line of the gate 61 and the cathodes 47 and 55 are both connected to the input line of the gate 62. The other cathodes which are to be used in the programming are similarly connected to the appropriate gates. Each gate controls a different operation in the arithmetic unit 45 via gate output lines 69.

For example, the gate 63 may control the accumulator operation "right shift"; the gate 62 the arithmetic operation "add"; and the gate 61 the operation of printing the results of a calculation. A gate (not shown) connected to the "1" cathode 12 may control the reading-in of data to the arithmetic unit.

A pulse generator 66 provides pulses which are fed by a second common input line 67 to the gates and which also control the operation of the arithmetic unit 45 via a line 68.

When the discharge rests on a cathode connected to a gate, the corresponding socket 64 becomes positive and so conditions the gate which is operated by the next pulse occurring on the line 67. The gate gives an output on the line 69 and initiates the corresponding operation in the arithmetic unit 45. When this operation is completed an "operation complete" pulse from the arithmetic unit operates the driving circuit 7.

Thus whenever the discharge is on the cathodes 47 and 55, the arithmetic operation of addition will be performed, and when the discharge reaches the last cathode 56, the results of the calculation are printed out.

The use of manual connections makes the sequence register very flexible in the way in which the cathodes, jump circuits and gates can be inter-connected. More than three jump circuits can be used to give further conditional or unconditional transfers. If more than 20 different steps are necessary, one or more additional multi-cathode tubes can be used, the anode of each tube being connected to the line 25 and the two electrodes 10 and 11 connected to the lines 9 and 8 respectively.

The circuit may be simplified to some extent by making the jump circuits operate as soon as the discharge reaches the controlling cathode, instead of waiting for the occurrence of the next pulse on the line 19. This simplification, however, entails a reduction in the number of programme steps available, because cathodes which are used to operate the jump circuits cannot also be used to operate gates.

Figure 2:
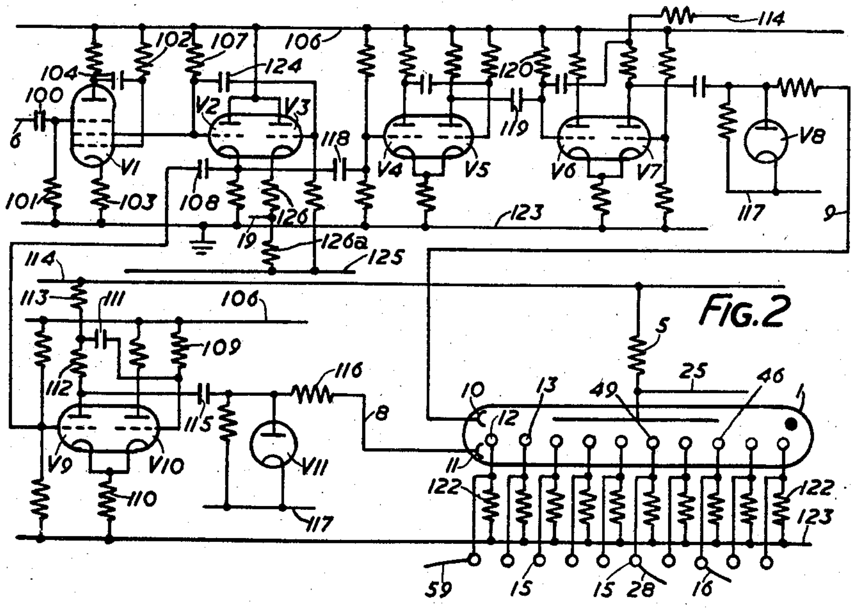
Figure 2 is a circuit diagram of the driving circuit and one of the multi-cathode switching tubes.

Considering the circuits in more detail, the positive pulse applied to the input line 6 of the driving circuit is differentiated by a capacitor 100 (Figure 2) and a resistor 101. The differentiated pulse is fed to the suppressor grid of a pentode V1. The control grid of V1 is connected to a +250 volt supply line 106, through a resistor 102. The screen grid normally draws a heavy current through a resistor 107. This current flowing through a cathode resistor 103 raises the cathode to a voltage such that the suppressor grid prevents current flow to the anode.

The differentiated pulse raises the suppressor grid voltage sufficiently to allow current to flow to the anode. This produces a voltage drop which is communicated to the control grid by a capacitor 104, so that the anode and grid voltages run down together. Most of the cathode current is diverted to the anode, allowing the screen voltage to rise. The screen stays at this higher voltage until the anode voltage bottoms, when the current again transfers to the screen.

The screen is directly coupled to the grid of a cathode follower V2. The cathode follower output is fed, via a capacitor 108, to one grid of a flip-flop formed by valves V9 and V10. V10 is normally held conducting by the connection of the grid to the positive line 106 through a resistor 109. The voltage drop across a common cathode resistor 110 is sufficient to hold V9 non-conducting.

A positive pulse from the cathode follower V2 drives

V9 into conduction. The anode of V9 is connected to a +450 volt supply line 114 through resistors 112 and 113 in series. The junction of these two resistors is connected to the grid of V10 by a capacitor 111. Hence, when V9 conducts, the grid of V10 is driven well below cut-off, and V9 remains conducting.

The grid of V10 starts to rise at a rate determined by the time constant of the resistor 109 and the capacitor 111. The time constant is such that the grid reaches the common cathode potential 10 micro-seconds after V10 has been cut-off. As soon as V10 starts to conduct, V9 is cut off and the flip-flop is in the original state.

A 250 volt negative-going pulse at the anode of V9 is fed to a D.C. restoring diode V11, via a capacitor 115. The cathode of the diode V11 is connected to a +40 volt line 117, so that a negative pulse, restored to this level, is fed via a resistor 116 and the line 8 to the first guide electrode 11 of the tube 1.

The output from the cathode follower V2 is also fed by a capacitor 118 to one grid of a flip-flop formed by valves V4 and V5. This flip-flop operates in the same manner as that formed by the valves V9 and V10, but the time constant is such that the output pulse lasts 7 micro-seconds.

The anode of V5 is connected to the grid of a valve V6 by a coupling capacitor 119. The valve V6 and a valve V7 are connected to form a further flip-flop, with V6 normally conducting. The capacitor 119 and a resistor 120 form a differentiating circuit, so that the trailing edge of the positive pulse at the anode of V5 produces a negative pulse on the grid of V6, to cut it off. The time constant of the flip-flop is such that V7 conducts for 10 micro-seconds.

The negative pulse at the anode of V7 is D.C. restored to +40 volts by a diode V8, corresponding to the diode V11 and the restored pulse is applied to the second guide electrode 10 of the tube 1 by the line 9. Thus the two guide electrodes each receive a 10 micro-second negative pulse, the pulses overlapping by 3 micro-seconds, for each input pulse at the terminal 6. These paired pulses cause the discharge to step from one cathode to the next. As already explained, the paired pulses are applied in common to both switching tubes.

The pulse which is applied to the cathode follower V2 is also fed to the grid of a second cathode follower V3, by a coupling capacitor 124. The grid of V3 is connected through a resistor to a —50 volt supply line 125. The cathode of V3 is connected to the same line through resistors 126 and **126*a*. The line 19 is connected to the junction of the resistors 126 and 126*a***, so that it receives one 50 micro-second positive pulse for each input pulse.

Each cathode of the tube 1 is connected to the ground line 123 through a resistor 122. The plug sockets 15 are connected directly to their respective cathodes. The cathodes of the tubes 2 are similarly connected. Hence a plug socket 15 is positive when the discharge is located on the cathode connected to that socket.

Figure 3:
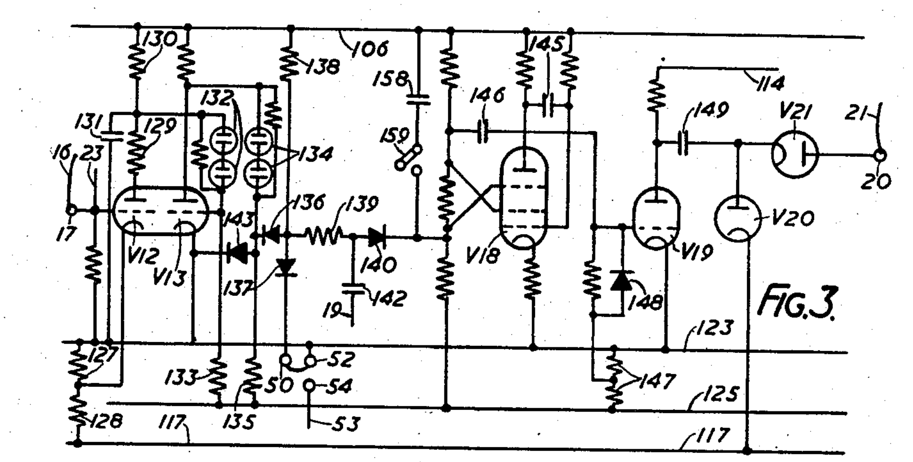
Figure 3 is a circuit diagram of one of the jump circuits.

The input socket 39 of the jump circuit 18 (Figure 1) is connected to the grid of a triode V12 (Figure 3). This triode is normally non-conducting since the grid is at ground potential and the cathode is held positive by a bias potentiometer, formed by two resistors 127 and 128, which is connected between the +40 volt line 117 and the ground line 123. When the discharge is located on the cathode 46 of the tube 1, the grid of V12 rises sufficiently to allow the triode to conduct.

The anode load of V12 consists of two resistors 129 and 130. The junction of these two resistors is connected to ground through a capacitor 131 and to the grid of a triode V13 through a pair of gas-filled diodes 132. The grid of V13 is also connected to the —50 volt line 125 by a resistor 133.

The diodes 132 are conducting when V12 is non-conducting, hence V13 is also conducting. When V12 conducts, the anode voltage starts to fall, but the rate of fall is reduced by the capacitor 131. When the junction of the resistors 129 and 130 has fallen approximately 35 volts, the voltage across the diodes 132 is insufficient to maintain conduction. The extinguishing of the diodes 132 allows the grid of V13 to fall, and it ceases to conduct. Thus the diodes 132 provide a rapid switching of V13.

When the discharge is moved off the cathode 46 of the tube 1 by a further input pulse, V12 ceases to conduct. The rise of the anode voltage is delayed by the capacitor 131, but eventually the voltage is high enough for the diodes 132 to fire, and V13 conducts once more. Hence the output from the anode of V13 is a square wave which is delayed on the input to V12. The capacitor 131 causes the leading and trailing edge of the output to be delayed by 50 and 60 micro-seconds respectively relative to the input.

The anode of V13 is connected through two gas-filled diodes 134 and a resistor 135 to the —50 volt line 125. The voltage across the diodes 134 is not sufficient to strike them when V13 is conducting. The junction of the diodes and the resistor 135 is then maintained at approximately —30 volts by current flowing from the line 106 through a resistor 138, a semi-conductor diode 136 and the resistor 135. The junction of the resistor 138 and the diode 136 is connected to the socket 50. The socket 50 can be connected either to the ground line 123 via the socket 52, or to the line 53 via the socket 54. The line 53 can assume one of two voltages, either zero (ground voltage) or approximately —40 volts.

If V13 becomes non-conducting, and the socket 50 is connected to ground, the diodes 134 are fired, and both sides of the diode 136 rise to ground potential, and are held there by conduction through diodes 137 and 143. The junction of the diodes 136 and 137 is connected by a resistor 139 and a diode 140 to a line 141. This line is at approximately ground potential.

Each pulse on the line 19 is applied to the junction of the resistor 139 and the diode 140 by a coupling capacitor 142. If the junction of the diodes 136 and 137 is at ground potential, a pulse on the line 19 will cause the diode 140 to conduct, so transmitting the pulse to the line 141. Pulses on the line 19 are approximately 25 volts in amplitude, so that if the diode junction is held at or below —30 volts by conduction in V13 and/or by the diode 137 being connected to the line 53, the diode 140 will prevent a pulse being transmitted to the line 141. Hence the line 141 receives a pulse under control of V12 only when a pulse occurs on the line 19, and the socket 50, is at ground potential, and V13 is non-conducting due to the discharge being located on the cathode to which the socket 17 is connected.

The line 141 is connected to the suppressor grid of a pentode V18, which is operated as a triggered transitron pulse generator. The suppressor grid is normally below cut-off, so that all the cathode current flows to the screen grid. A positive pulse on the line 141 brings the suppressor grid above cut-off, and the major part of the cathode current is diverted to the anode. The fall in anode voltage is fed to the control grid by a coupling capacitor 145, so that the anode and the control grid run down together. During the run down, the screen voltage is high. After 70 micro-seconds the anode voltage reaches minimum, the screen grid begins to take more current and the valve rapidly reverts to the original condition.

The 70 micro-second pulse on the screen of V18 is fed to the grid of a triode V19 by a coupling capacitor 146. The triode is normally cut off by the bias voltage from a potentiometer 147. The pulse is D.C. restored by a diode 148, and allows V19 to conduct to produce a 350 volt negative pulse at the anode. This output pulse is applied to the cathode 47 of the tube 2 via a coupling capacitor 149, an isolating diode V21, and the connection 21. The output pulse is restored to +40 volts by a further diode V20. The jump circuits 32 and 58 are similar.

Figure 4:
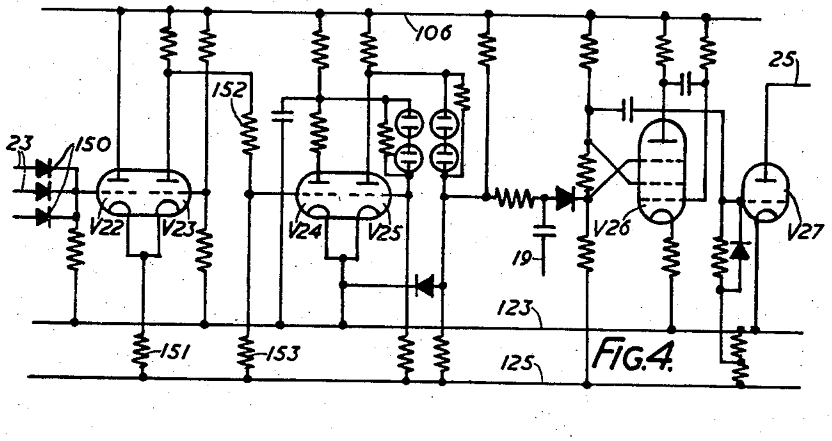
Figure 4 is a circuit diagram of the anode quench circuit.

The quench circuit 24 (Figures 1 and 4) is very similar to the jump circuit already described, except for the input and output arrangements. The lines 23 are connected through semi-conductor isolating diodes 150 to the grid of a triode V22. This triode shares a cathode resistor 151 with a further triode V23. The valve V23 is normally conducting due to a positive bias applied to the grid. The voltage across the resistor 151 is sufficient to maintain V22 cut off.

When any one of the lines 23 rises due to the arrival of the discharge on a corresponding cathode, V22 is allowed to conduct. The commoned cathodes rise sufficiently to cut off current in V23. The anode of V23 is connected by resistors 152 and 153 to the −50 volt line 125. The junction of the two resistors is either at ground potential, or approximately the same positive voltage as a switching tube cathode on which the discharge is located, depending upon whether V23 is conducting or non-conducting.

The grid of a triode V24 is connected to the junction of the resistors 152 and 153. The valve V24 and a valve V25 together form a pulse delay circuit similar to that formed by the valves V12 and V13 (Figure 3). Hence V25 provides a delayed positive output pulse each time one of the lines 23 is pulsed. This allows a pulse from the line 19 to be fed to a transitron pulse generator V26. Since no gating is required, the coupling network is simplified by the omission of diodes corresponding to the diodes 136 and 137. The circuit constants associated with V26 are such that it produces a 30 micro-second positive pulse on the screen.

The positive pulse from the screen of V26 causes a triode V27 to conduct heavily. The anode of V27 is connected by the line 25 to the anodes of the counting tubes 1 and 2. The additional current through the common load resistor 5 reduces the voltage applied to the counting tubes below that necessary to maintain a discharge. After 30 micro-seconds the anodes rise and the discharge is re-established to that cathode which is still being held negative by the output from one of the jump circuits.

Figure 5:
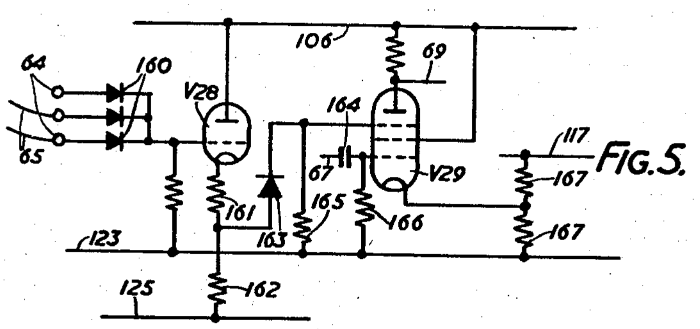
Figure 5 is a circuit diagram of an output gate.

Each of the gates 61, 62 and 63 has as many input sockets 64 (Figures 1 and 5) as are required. These sockets are connected through semi-conductor isolating diodes 160 to the grid of a cathode follower V28, the cathode of which is connected through resistors 161 and 162 in series to the −50 volt line 125. The junction of the resistors 161 and 162 is connected through a diode 163 to the suppressor grid of a pentode V29. The control grid of the pentode receives pulses from the pulse generator via the line 67 and a coupling capacitor 164. The suppressor grid and the control grid are connected to the ground line 123 through resistors 165 and 166 respectively. The cathode is kept at about +10 volts by a potential divider 167 between the lines 117 and 123.

The valve V29 is normally non-conducting and positive pulses on the line 67 do not cause anode current to flow as the suppressor grid is still held down to ground potential.

When the discharge in the tubes 1 and 2 rests on a cathode which is connected to the gate by one of the lines 65, a positive voltage is applied to the grid of the valve V28 which causes the voltage of the suppressor grid of V29 to rise allowing the control grid to control the anode current. When the next pulse appears on the line 67, the valve conducts and a negative pulse is produced on the output line 69 connected to the anode.

When the circuits are first switched on, it is necessary to bring the discharge to the first cathode 12. This is effected by the jump circuit 58 which has a normally open switch 159 (Figure 3) in series with a capacitor 158 connected across the lines 106 and 141. When the switch 159 is momentarily closed, a positive pulse is produced on the line 141 which operates the valve V18 to initiate a discharge to the cathode 12.

The construction of the arithmetic unit 45 has not been described in detail, since the exact form of operation does not affect the operation of the sequence register.

What we claim is:

1. Electronic switching apparatus comprising a source of input pulses, a multi-cathode gas-discharge tube including guide electrodes within said tube and means for applying said input pulses to said guide electrodes to step the anode to cathode discharge along the cathodes in a predetermined sequence, first and second control means, each control means being connected to a first cathode of said tube and to said source of input pulses and being responsive to an input pulse, when the discharge is located on said first cathode, to produce an output pulse, means for applying the output pulse of said first control means to the anode of the tube to extinguish the discharge to the first cathode, means for applying the output pulse of the second control means to a second cathode of said tube, said second cathode being a cathode other than a cathode following said first cathode in said predetermined sequence, to initiate a discharge to the second cathode, and switching means connected to the cathodes of the tube and responsive individually to the location of the discharge on the different cathodes.

2. A pulse responsive device comprising at least two multi-cathode gas discharge tubes, a resistive impedance common to the anode circuit of all said tubes and of such a value that a discharge may be maintained in only one of said tubes at a time, a source of input pulses, means for applying said input pulses in common to said tubes to step the discharge along the cathodes of the tube in which the discharge is maintained, control means connected to one cathode of a first tube and to said source of input pulses, said control means being responsive to an input pulse to produce an output pulse when the discharge is located on said one cathode, and means for applying said output pulse to a selected cathode of a second tube to initiate a discharge to said selected cathode.

3. Programme step switching apparatus for an electronic calculator comprising a plurality of multi-cathode gas discharge tubes, a common supply of anode voltage for said tubes, a common impedance connecting the anodes of said tubes to said supply such that a discharge is maintainable in one only of said tubes at any one time, a multi-step calculating unit, means for producing a pulse on the completion of each step of calculation, means for applying said pulses to all said tubes to step the discharge along the cathodes of the tube in which the discharge is maintained, first control means and second control means each connected to one cathode of a first one of said tubes and to said pulse producing means and each connected for producing an output pulse in response to a pulse from said pulse producing means when the discharge is located on the said connected cathode, means for applying the output pulse from the first control means to the anodes of all the tubes to extinguish the discharge, means for applying the output pulse from the second control means to a predetermined cathode of a second one of said tubes to initiate a discharge to said predetermined cathode of said second tube, a plurality of gating means connected to at least some of the cathodes of said tubes, means for applying pulses to all the gating means, each gating means being responsive to a pulse applied thereto to produce an output pulse when the discharge is located on the cathode to which the gating means is connected, and means for applying each output pulse from the gating means to the calculating unit to initiate a step of calculation.

4. Apparatus according to claim 3 comprises also means for rendering said first and second control means ineffective in response to a control voltage.

5. Apparatus according to claim 3 comprising also manually adjustable means for selecting any one of said cathodes of said first tube as said connected cathode and any one of the cathodes of another one of said tubes as said predetermined cathode.

6. Programme step switching apparatus for an electronic calculator comprising a calculating unit, means for producing a pulse on the completion of each step of calculation, a plurality of multi-cathode gas discharge tubes, a common anode impedance for all said tubes such that an anode to cathode discharge is maintainable in one only of said tubes at a time, means for applying said pulses to all said tubes to step the discharge along the cathodes in any tube in which the discharge is maintained in a predetermined sequence, a delayed pulse generator connected to a first selected cathode of a first one of said tubes for producing after a delay a pulse when the discharge is located on said selected cathode, means connected to said delayed pulse generator and said pulse producing means for producing an output pulse on the simultaneous occurrence of pulses from said pulse generator and pulse producing means, means for applying said output pulse to a second selected cathode other than that cathode to which the discharge would be stepped from said first selected cathode in said predetermined sequence, to establish a discharge to said second selected cathode, control means for extinguishing said discharge operated simultaneously with said delayed pulse generator, a plurality of gating means connected individually to different cathodes of said tubes including said first and second selected cathodes, each gating means being responsive to a pulse applied thereto to produce an operating pulse when the discharge is located on the cathode to which the gating means is connected, and means for applying each operating pulse to said calculating unit to initiate a step of calculation.

7. Electronic switching apparatus comprising a source of pulses for causing successive switch operations; a plurality of multi-cathode gas-discharge tubes; a common anode impedance permitting anode to cathode discharge in one only of said tubes at any one time; means for applying said pulses to said tubes in common to effect stepping of the discharge in any one of said tubes in which the discharge is maintained in a predetermined sequence; at least one jump circuit for causing said discharge to pass from a first selected cathode of said tubes to a second selected cathode other than that cathode to which the discharge is stepped from said first selected cathode in said predetermined sequence, said jump circuit comprising a first delayed pulse generator connected to said first selected cathode for generating after a delay a pulse when the discharge is located on said first selected cathode, and means for applying an output pulse to said second selected cathode on the simultaneous occurrence of pulses from said source and said first delayed pulse generator; a quench circuit comprising an additional tube having said impedance in its anode circuit, a second delayed pulse generator connected to said first selected cathode for generating with a delay a pulse when the discharge is located on said first selected cathode, means for producing a second output pulse on the simultaneous occurrence of pulses from said source and said second delayed pulse generator, and means for applying said second output pulse to said additional tube to cause said additional tube to conduct and thereby to reduce the anode voltage of said multi-cathode tubes below the value necessary to maintain the discharge for a time less than the duration of said first output pulse; and switching means connected to at least some of the cathodes for causing switching operations when the discharge is located on the cathodes to which said switching means are connected.

8. Electronic switching apparatus comprising a source of pulses for causing successive switching operations; a plurality of multi-cathode gas-discharge tubes each having a pair of guide electrodes; a common anode impedance permitting anode to cathode discharge in one only of said tubes at any one time; means connected to said source for generating a control pulse and for applying to said guide electrodes a pair of pulses overlapping in time in response to a pulse from said source to step the anode to cathode discharge along the cathodes of the tube in which the discharge is maintained in a predetermined sequence; at least one jump circuit for causing said discharge to pass from a first selected cathode of said tubes to a second selected cathode other than that cathode to which the discharge is stepped from said first selected cathode in said predetermined sequence, said jump circuit comprising a first delayed pulse generator connected to said first selected cathode for generating after a delay a pulse when the discharge is located on said first selected cathode, and means for applying an output pulse to said second selected cathode on the simultaneous occurrence of a pulse from said first delayed pulse generator and a control pulse; a quench circuit comprising an additional tube having said impedance in its anode circuit, a second delayed pulse generator connected to said first selected cathode for generating with a delay a pulse when the discharge is located on said first selected cathode, means for producing a second output pulse on the simultaneous occurrence of a pulse from said second delayed pulse generator and a control pulse, and means for applying said second output pulse to said additional tube to cause said additional tube to conduct and thereby to reduce the anode voltage of said multi-cathode tubes below the value necessary to maintain the discharge for a time less than the duration of said first output pulse; and switching means connected to at least some of the cathodes for causing switching operations when the discharge is located on the cathode to which said switching means are connected.

References Cited in the file of this patent

UNITED STATES PATENTS

| | | |
|---|---|---|
| 2,651,004 | Acton | Sept. 1, 1953 |
| 2,658,166 | Depp | Nov. 3, 1953 |
| 2,679,978 | Kandiah | June 1, 1954 |
| 2,810,099 | Townsend et al. | Oct. 15, 1957 |

OTHER REFERENCES

Townsend: "A New Cold-Cathode Counting or Stepping Tube," from Bell Telephone System, Monograph No. 1772, September 1950.